United States Patent

Oishi et al.

[11] Patent Number: 5,849,376
[45] Date of Patent: Dec. 15, 1998

[54] MULTI-LAYERED LAMINATE COMPRISING HYDROLYZED EVOH AND USE THEREOF

[75] Inventors: Tsukasa Oishi; Masahiko Toyozumi, both of Osaka, Japan

[73] Assignee: Nippon Gohsei Kagaku Kogyo Kabushiki Kaisha, Osaka, Japan

[21] Appl. No.: 699,465

[22] Filed: Aug. 19, 1996

[30] Foreign Application Priority Data

| Aug. 21, 1995 | [JP] | Japan | 7-236064 |
| Oct. 16, 1995 | [JP] | Japan | 7-293501 |
| Oct. 18, 1995 | [JP] | Japan | 7-296171 |
| Dec. 28, 1995 | [JP] | Japan | 7-353293 |
| Dec. 28, 1995 | [JP] | Japan | 7-353297 |

[51] Int. Cl.[6] .............................. B32B 5/14; B32B 27/30; B32B 9/04

[52] U.S. Cl. ..................... 428/34.9; 428/471; 428/516; 428/522; 428/704

[58] Field of Search ..................... 428/515, 516, 428/34.9, 522, 213, 471, 704

[56] References Cited

U.S. PATENT DOCUMENTS

| 5,164,258 | 11/1992 | Shida et al. |  |
| 5,298,334 | 3/1994  | Moriyama et al. | 428/474.4 |
| 5,466,748 | 11/1995 | Ikeda et al. | 525/57 |

FOREIGN PATENT DOCUMENTS

| 0 400 604 A2 | 5/1990  | European Pat. Off. |
| 0 483 696 A2 | 5/1992  | European Pat. Off. |
| 55 154 232   | 12/1980 | Japan . |
| 60-34461     | 8/1985  | Japan . |
| 63 178 931   | 7/1988  | Japan . |
| 64-38233     | 2/1989  | Japan . |
| 64-38232     | 3/1989  | Japan . |
| 5-147177     | 6/1993  | Japan . |
| 533 8102     | 12/1993 | Japan . |
| 06 091 824   | 4/1994  | Japan . |
| 6-28891      | 8/1994  | Japan . |
| 6-328634     | 11/1994 | Japan . |
| 6-340033     | 12/1994 | Japan . |
| 7-52333      | 2/1995  | Japan . |
| 2518564      | 5/1996  | Japan . |
| 2518565      | 5/1996  | Japan . |
| 1 391 182    | 4/1975  | United Kingdom . |
| 2 182 334    | 5/1987  | United Kingdom . |

*Primary Examiner*—H. Thi Le
*Attorney, Agent, or Firm*—Armstrong, Westerman, Hattori, McLeland & Naughton

[57] ABSTRACT

A laminate having an excellent gas barrier property and an improved organic solvent resistance and suitable for use in containers for chemicals and volatile materials such as organic solvents and fuels. The laminate comprises:

(A) a layer comprising (A1) a hydrolyzed ethylene-vinyl acetate copolymer having an ethylene content of 10 to 70% by mole and a degree of hydrolysis of at least 85% by mole, (B) a layer of a resin composition comprising (B1) a polyolefin resin and (B2) 0.5 to 40% by weight, based on said polyolefin (B1), of a hydrolyzed ethylene-vinyl acetate copolymer having an ethylene content of 10 to 70% by mole and a degree of hydrolysis of at least 85% by mole, (C) an outer layer of a polyolefin resin disposed on the outer side of said layer (A), and optionally an outer layer of said polyolefin resin (C) disposed on the other side and at least one adhesive layer disposed between adjacent two layers, wherein the ratio of the apparent melt viscosity of said polyolefin (B1) to that of said hydrolyzed copolymer (B2) at a rate of shear of 100 $cm^{-1}$ and at 230° C. is from 0.1 to 50.

16 Claims, No Drawings

MULTI-LAYERED LAMINATE COMPRISING HYDROLYZED EVOH AND USE THEREOF

BACKGROUND OF THE INVENTION

The present invention relates to a laminate having excellent gas barrier property and organic solvent resistance, and a container made of the laminate.

In general, a hydrolyzed ethylene-vinyl acetate copolymer (hereinafter referred to as "EVOH") is superior in transparency, antistatic property, oil resistance, solvent resistance, gas barrier property, perfume retainability and the like. In uses as packaging materials, EVOH has been utilized in various packaging purposes in such a manner as laminating a film of low density polyethylene, polypropylene, nylon, polyester or the like onto the both surfaces of an EVOH film so as to offset the deficiencies of EVOH such as drop test number (impact strength), thermal formability and moisture proof, while maintaining the good properties of EVOH such as gas barrier property, perfume retainability and prevention of discoloration of foods.

Recently, EVOH has been utilized not only for packaging purposes such as bottles for foods as mentioned above, but also for purposes of containers such as bottles and tanks for transportation and storage of agricultural chemicals, reagents, and volatile materials composed mainly of hydrocarbon compounds, e.g. various organic solvents and fuels such as kerosene.

EVOH has in general a good gas barrier property and solvent resistance, but the solvent resistance is not so high that it can be exposed to such hydrocarbon solvents without any problems. In particular, in the case of stretched films or sheets and containers made thereof, there occurs so-called solvent cracking (stress cracking) where strain resulting from the stressed in stretching produces cracks by the influence of the solvents.

In order to avoid such an unfavorable influence of organic solvents, various proposals have been made, for example, (1) a three-layer laminate consisting of an intermediate layer wherein a gas barrier resin such as polyamide, polyvinyl alcohol or EVOH is dispersed as a discontinous phase into a polyethylene resin matrix, and outer layers of a polyethylene resin on both sides of the intermediate layer (Japanese Patent Publication Kokai No. 6-218891); (2) incorporation of at least one thermoplastic resin selected from the group consisting of polyamide, polyolefin and polyester into EVOH (Japanese Patent Publication Kokai No. 7-52333); (3) lamination of an EVOH layer containing a plasticizer with a layer of a thermoplastic resin such as polyamide or polyolefin (Japanese Patent Publication Kokai No. 6-328634); (4) lamination of a resin layer containing EVOH or polyamide with a polyolefin layer treated with a halogen compound or a sulfur compound (Japanese Patent Pulblication Kokai No. 6-340033); and (5) lamination of a polyamide or EVOH layer with a polyolefin layer using a specific modified polyolefin as an adhesive for the lamination (Japanese Patent Publication Kokai Nos. 64-38232 and 64-38233 and Kokoku No. 60-34461).

However, the above proposal (1) is difficult to exhibit the sufficient barrier property to satisfy the demand of the recent markets. The proposal (2) is insufficient in solvent cracking resistance, and there is yet room for improvement in the barrier property. The proposal (3) has an apprehension of lowering the adhesive strength between the EVOH layer and the adhesive layer. The proposal (4) leaves a problem in safety at the time of the treatment (deterioration of working environment). The proposal (5) is still lacking in solvent cracking resistance. Thus, it is the actual situation that no satisfactory laminate has yet been proposed.

Accordingly, it is an object of the present invention to provide a laminate having an excellent gas barrier property and an improved organic solvent resistance.

A further object of the present invention is to provide a laminate made from EVOH suitable for the production of containers or vessels for storage and transportation of organic solvents, fuels and the like.

Another object of the present invention is to provide a container having excellent properties such as gas impermeability and solvent resistance.

These and other objects of the present invention will become apparent from the description hereinafter.

SUMMARY OF THE INVENTION

In accordance with the present invention, there is provided a laminate comprising:

(A) a layer comprising (A1) a hydrolyzed ethylene-vinyl acetate copolymer having an ethylene content of 10 to 70% by mole and a degree of hydrolysis of at least 85% by mole, (B) a layer of a resin composition comprising (B1) a polyolefin resin and (B2) 0.5 to 40 parts by weight, per 100 parts by weight of said polyolefin resin (B1), of a hydrolyzed ethylene-vinyl acetate copolymer having an ethylene content of 10 to 70% by mole and a degree of hydrolysis of at least 85% by mole, and (C) a layer of a polyolefin resin disposed on the outer side of said layer (A), wherein the ratio of the apparent melt viscosity of said polyolefin resin (B1) to that of said hydrolyzed copolymer (B2) at a rate of shear of 100 $cm^{-1}$ and at 230° C. is from 0.1 to 5 0.

Preferably, the polyolefin layer (C) is also disposed on the outer side of the resin composition layer (B).

The laminate of the present invention has an excellent gas barrier property and an excellent organic solvent resistance, and containers or vessels made thereof are very useful as containers for agricultural chemicals, reagents, and volatile compounds composed mainly of hydrocarbons (various organic solvents and fuels) such as kerosene. Molded articles having such a built-up layer structure are of course useful for other purposes in view of their excellent properties.

DETAILED DESCRIPTION

The hydrolyzed ethylene-vinyl acetate copolymer (EVOH) (A1) used in the EVOH layer (A) must be one having an ethylene content of 10 to 70% by mole, preferably 15 to 65% by mole, more preferably 20 to 60% by mole, and having a degree of hydrolysis of at least 85% by mole, preferably at least 90% by mole, more preferably at least 95% by mole. If the ethylene content is less than 10% by mole, the melt moldability is lowered, and if the ethylene content is more than 70% by mole, no sufficient gas barrier property is obtained. Also, if the degree of hydrolysis is less than 85% by mole, the gas barrier property and resistance to organic solvents (volatile compounds composed mainly of hydrocarbons) are lowered.

The EVOH (A1) may contain a small amount, e.g., up to 15% by mole, especially up to 10% by mole, of a comonomer so long as the properties such as transparency, gas barrier property and solvent resistance are not substantially impaired. Examples of the comonomer are, for instance, an α-olefin such as propylene, isobutene, α-octene, α-dodecene or α-octadecene; an unsaturated carboxylic acid, its salt, its partial alkyl ester and its full alkyl ester; a nitrile; an amide; an anhydride; an unsaturated sulfonic acid and its salt; and the like.

A boron compound (A2) may be added to the EVOH layer (A) in order to raise the stress cracking resistance of the layer (A). Examples of the boron compound (A2) are, for instance, boric acid, borax and their derivatives, e.g., a boric acid ester such as ethyl borate and a metal salt of boric acid such as sodium borate or magnesium borate; a halogenated boron compound, such as trichloroboron, and its coordination compound with an ether or an amine; a trialkyl or triaryl boron compound, such as trimethylboron or triphenylboron, and its coordination compound; and the like. Boric acid and borax are preferably used. The boron compound (A2) incorporated into the EVOH layer (A) is used in such an amount that the content of boron is from 0.001 to 0.5% by weight, preferably 0.001 to 0.4% by weight, more preferably 0.001 to 0.3% by weight, based on the EVOH (A1). If the boron content is less than 0.001% by weight, the stress cracking resistance is not raised. If the boron content is more than 0.5% by weight, problems such as roughing of the surface of moldings and uneven thickness of moldings arise, thus the moldability is lowered.

The EVOH layer (A) may further contain a polyolefin resin (A3), whereby the low temperature impact resistance of the layer (A) is improved. Various kinds of polyolefin resins can be used as the polyolefin resin (A3). Examples of the polyolefin resin (A3) are, for instance, high density polyethylene, medium density polyethylene, low density polyethylene, linear low density polyethylene, ultra low density polyethylene, copolymers of ethylene with a minor amount of a comonomer, e.g., vinyl acetate, an acrylic or methacrylic acid ester or an α-olefin such as butene, hexene or 4-methyl-1-pentene, polypropylene homopolymer, a graft copolymer of polypropylene and ethylene, copolymers of propylene with a minor amount of a comonomer, e.g., an α-olefin such as 4-methyl-1-pentene, poly-1-butene, poly-4-methyl-1-pentene, modified polyolefins derived from the above-mentioned polyolefins, e.g., the above-mentioned polyolefins modified by copolymerization or graft polymerization with an unsaturated carboxylic acid or an anhydride thereof, a vinylsilane compound or an epoxy group-containing compound, and the like. High density polyethylene, medium density polyethylene, (linear) low density polyethylene and ultra low density polyethylene are preferred.

The amount of the polyolefin resin (A3) is from 5 to 100 parts by weight, especially 10 to 80 parts by weight, per 100 parts by weight of the EVOH (A1). If the amount of the polyolefin resin (A3) is less than 5 parts by weight, the low temperature impact resistance is not sufficiently improved. If the amount is more than 100 parts by weight, it becomes difficult to stably exhibit the gas barrier property. When a carboxylic acid-modified polyolefin resin (A5) mentioned after later is also used with the polyolefin resin (A3), the total amount of the resins (A3) and (A5) should fall within the above range.

The EVOH layer (A) may also contain a terminal-controlled polyamide resin (A4), whereby the solvent cracking resistance and low temperature impact resistance of the layer (A) are further improved. As the terminal-controlled polyamide resin (A4), there are used polyamide resins wherein the number of terminal COOH groups (x) and the number of terminal CONRR' groups (y), in which R is a hydrocarbon group having 1 to 22 carbon atoms and R' is hydrogen atom or a hydrocarbon group having 1 to 22 carbon atoms, are controlled by a terminal controlling agent so as to satisfy the equation: $(100 \times y)/(x+y) \geq 5$. Preferable, the hydrolyzed ethylene-vinyl acetate copolymer (A1) and the terminal-controlled polyamide resin (A4) are present in the layer (A) in an (A1):(A4) ratio of 70:30 to 96:4 by weight.

Such terminal-controlled polyamide resins (A4) are prepared by carrying out polycondensation of the raw materials for the polyamides in the presence of a monoamine having 1 to 22 carbon atoms or in the presence of the monoamine and a monocarboxylic acid having 2 to 23 carbon atoms.

The polyamide raw materials include, for instance, a lactam such as ε-caprolactam, enantholactam, capryllactam, lauryllactam, α-pyrrolidone or α-piperidone; an ω-amino acid such as 6-aminocaproic acid, 7-aminoheptanoic acid, 9-aminononanoic acid or 11-aminoundecanoic acid; a dibasic acid such as adipic acid, glutaric acid, pimelic acid, suberic acid, azelaic acid, sebacic acid, undecanedioic acid, dodecanedioic acid, hexadecanedioic acid, eicosadienedioic acid, diglycolic acid, 2,2,4-trimethyladipic acid, xylylene dicarboxylic acid, 1,4-cyclohexane dicarboxylic acid, terephthalic acid or isophthalic acid; and a diamine such as hexamethylenediamine, tetramethylenediamine, nonamethylenediamine, undecamethylenediamine, dodecamethylenediamine, 2,2,4- or 2,4,4-trimethyl-hexamethylenediamine, bis(4,4'-aminocyclohexyl)methane or m-xylylene diamine.

Examples of the monoamine having 1 to 22 carbon atoms are, for instance, an aliphatic monoamine such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, eicosylamine or docosylamine; an alicyclic monoamine such as cyclohexylamine or methylcyclohexylamine; an aromatic monoamine such as benzylamine or β-phenylethylamine; a symmetric secondary amine such as N,N-dibutylamine, N,N-dihexylamine, N,N-dioctylamine or N,N-didecylamine; and a mixed secondary amine such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, N-methyl-N-cyclohexylamine or N-methyl-N-benzylamine.

Examples of the monocarboxylic acid having 2 to 23 carbon atoms are, for instance, an aliphatic monocarboxylic acid such as acetic acid, propionic acid, butylic acid, valeric acid, caproic acid, enanthic acid, caprylic acid, capric acid, pelargonic acid, undecanoic acid, lauric acid, tridecanoic acid, myristic acid, palmitic acid, stearic acid, oleic acid, linoleic acid, arachic acid or behenic acid; an alicyclic monocarboxylic acid such as cyclohexane carboxylic acid or methylcyclohexane carboxylic acid; and an aromatic monocarboxylic acid such as benzoic acid, toluic acid, methyl benzoic acid or phenylacetic acid.

In addition to the monoamine or a combination of the monoamine and the monocarboxylic acid used in the preparation of the terminal-controlled polyamide resin (A4), diamines and/or dicarboxylic acids may be further present in the reaction system, as occasion demands, e.g., an aliphatic diamine such as ethylenediamine, trimethylenediamine, tetramethylenediamine, pentamethylenediamine, hexamethylenediamine, octamethylenediamine, decamethylenediamine, dodecamethylenediamine, or 2,2,4- or 2,4,4-trimethylhexamethylenediamine; an alicyclic diamine such as cyclohexanediamine or bis(4,4'-aminocyclohexyl)methane; an aromatic diamine such as xylenediamine; an aliphatic dicarboxylic acid such as malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, octadecenedioic acid, eicosanedioic acid, eicosenedioic acid, docosanedioic acid or 2,2,4-trimethyladipic acid; an alicyclic dicarboxylic acid such as 1,4-cyclohexanedicarboxylic acid; and an aromatic dicarboxylic acid such as terephthalic acid, isophthalic acid or xylenedicarboxylic acid.

In the preparation of the terminal-controlled polyamide resin (A4), the reaction is initiated in a usual manner using the above-mentioned polyamide raw materials. The above-mentioned carboxylic acid and amine compounds can be added to the reaction system in any stage from the initiation of the reaction up to starting a reaction under a reduced pressure. The carboxylic acid and the amine may be added together or separately.

The monocarboxylic acid and monoamine to be coexisted as a terminal controlling agent in the polycondensation of the polyamide raw materials are used, respectively, in an amount of 2 to 20 milliequivalents, preferably 3 to 19 milliequivalents, of carboxyl group or amino group per mole of the polyamide raw materials (per mole of each of the dicarboxylic acid and the diamine, namely per mole of a recurring unit). With respect to the equivalent of amino group, the amount of amino group which reacts with one equivalent of a carboxylic acid to produce amido bonding, is one equivalent. If the amount of these terminal controlling agents is too small, the terminal-controlled polyamide effective for improving the solvent cracking resistance and the low temperature impact resistance cannot be prepared. If the amount is too large, it is difficult to prepare a polyamide having a high molecular weight, thus exerting an unfavorable influence on the physical properties of the obtained polyamide.

The reaction is carried out in such a manner that the pressure in the final stage of the reaction is at most 400 Torrs, preferably at most 300 Torrs. If the pressure in the final stage is high, a polyamide having a desired relative viscosity is not obtained. A low pressure does not particularly cause inconvenience. The reaction time under reduced pressure is at least 0.5 hour, usually from about 1 to about 2 hours.

The hydrocarbon group shown by R or R' in the terminal —CONRR' group of the terminal-controlled polyamide resin (A4) includes, for instance, an aliphatic hydrocarbon group such as methyl group, ethyl group, propyl group, butyl group, pentyl group, hexyl group, heptyl group, octyl group, 2-ethylhexyl group, nonyl group, decyl group, undecyl group, dodecyl group, tridecyl group, tetradecyl group, tetradecylene group, pentadecyl group, hexadecyl group, heptadecyl group, octadecyl group, eicosyl group or decosyl group; an alicyclic hydrocarbon group such as cyclohexyl group, methylcyclohexyl group or cyclohexylmethyl group; and an aromatic hydrocarbon group such as phenyl group, toluyl group, benzyl group or β-phenylethyl group.

The conversion of the terminal —COOH group into the —CONRR' group in the terminal-controlled polyamide (A4), which is adjusted by coexisting the specific amine or a combination thereof with the specific carboxylic acid as mentioned above in the reaction system at the time of preparing the polyamide, is preferably such that the relationship between the number of terminal —COOH groups (x) and the number of terminal —CONRR' groups (y) satisfies the equation: $(100 \times y)/(x+y) \geq 5$, preferably the equation: $(100 \times y)/(x+y) \geq 10$. It is also desirable that the amount of the nonconverted —COOH group is at most 50 μeq/g of polymer, preferably at most 40 μeq/g of polymer, more preferably at most 20 μeq/g of polymer. If the conversion is small, the effects produced by the polyamide (A4) cannot be expected. A large conversion does not cause any inconvenience in the physical properties, but the preparation becomes difficult and, therefore, it is advisable to adjust the conversion so that the amount of the nonconverted terminal —COOH group is at least 1 μeq/g of polymer.

The terminal —CONRR' group can be determined by means of gas chromatography by hydrolyzing the polyamide (A4) using hydrochloric acid. The —COOH group can be determined by titration of a benzyl alcohol solution of the polyamide with 0.1N sodium hydroxide.

As the terminal groups of the polyamide (A4) are also present —COOH and —NH$_2$ groups derived from the above-mentioned polyamide raw materials in addition to the —CONRR' group.

The terminal amino groups may be either modified or unmodified. However, from the viewpoints of good flowability and heat stability of molten polyamide, it is desirable that the terminal amino groups are also modified with the above-mentioned hydrocarbon groups.

The EVOH layer (A) may further contain a carboxylic acid-modified polyolefin (A5), whereby the low temperature impact resistance of the layer (A) is improved, and a compound (A6) selected from the group consisting of salts, oxides and hydroxides of alkali and alkaline earth metals, whereby the melt formability is improved. The carboxylic acid-modified polyolefin (A5) is used in combination with the alkali or alkaline earth metal compound (A6).

The carboxylic acid-modified polyolefins (A5) used in the present invention are those derived from polyolefins as exemplified for the polyolefin (A3), such as ultra low density polyethylene, low density polyethylene, linear low density polyethylene, high density polyethylene, polypropylene and other polyolefins, and copolymers of a predominant amount of olefins and other monomers such as a vinyl monomer, e.g. an ethylene-vinyl acetate copolymer and an ethylene-ethyl acrylate copolymer which have a large ethylene content. The modified polyolefins are prepared by graft polymerization of these polyolefins with a carboxylic acid or copolymerization of monomers constituting these polyolefins with a carboxylic acid. Examples of the carboxylic acid are, for instance, maleic acid, acrylic acid, itaconic acid, crotonic acid, maleic anhydride, itaconic anhydride, and other unsaturated aliphatic carboxylic acids or anhydrides thereof. Maleic anhydride is preferably used. It is practical that the content of carboxyl group in the resin (A5) is from about 0.002 to about 0.2 equivalent per 100 g of the carboxylic acid-modified polyolefin (A5).

The alkali or alkaline earth metal compound (A6) is selected from salts such as inorganic acid salts and fatty acid salts, oxides and hydroxides of alkali metals such as lithium, sodium and potassium and alkaline earth metals such as magnesium, calcium and barium. Typical examples of the metal compound (A6) are, for instance, sodium carbonate, lithium carbonate, magnesium carbonate, calcium carbonate, barium carbonate, sodium hydroxide, lithium hydroxide, magnesium hydroxide, calcium hydroxide, potassium hydroxide, barium hydroxide, magnesium oxide, and salts of saturated or unsaturated fatty acids such as formic acid, acetic acid, propionic acid, butyric acid, citric acid, palmitic acid, myristic acid, stearic acid, oleic acid, linoleic acid, linolenic acid, tallow fatty acid, coconut oil fatty acid and palm oil fatty acid.

Examples of the fatty acid salt are, for instance, magnesium formate, sodium acetate, lithium acetate, potassium acetate, magnesium acetate, calcium acetate, barium acetate, magnesium propionate, calcium propionate, magnesium butyrate, sodium stearate, potassium stearate, magnesium stearate, calcium stearate, sodium oleate, magnesium oleate, calcium oleate, and the like. Magnesium acetate, calcium acetate, magnesium propionate and calcium stearate are preferably used.

The carboxylic acid-modified polyolefin (A5) is used in an amount of 5 to 100 parts by weight per 100 parts by weight of the EVOH (A1). The modified polyolefin (A5) is incorporated into the EVOH layer (A) containing the polyolefin (A3).

It is preferable that the total amount of the polyolefin (A3) and the modified polyolefin (A5) is from 5 to 100 parts by weight, especially 10 to 80 parts by weight, per 100 parts by weight of the EVOH (A1). If the total amount (A3+A5) is less than the above range, the low temperature impact resistance is not improved. If the total amount is more than the above range, it is difficult to exhibit a stable gas barrier property. The polyolefin (A3) and the modified polyolefin (A5) are used in such a proportion that the number of equivalents of carbonyl groups present in (A3+A5) is from 0.002 to 0.05, preferably 0.004 to 0.02, per 100 g of a combination of (A3) and (A5). If the number of equivalents of carbonyl group is less than the above range, it is difficult to exhibit a stable gas barrier property, and if more than the above range, the fluidity is detriorated, thus the surface roughness of the obtained moldings becomes marked.

Further, with respect to the relationship between the carboxylic acid-modified polyolefin (A5) and the alkali or alkaline earth metal compound (A6), it is preferable that the equivalent ratio of the metal of compound (A6) to the carbonyl group of modified pololefin (A5) is from 0.1 to 10, especially 1 to 3. If the equivalent ratio is less than the above range, the melt formability is apt to be lowered, so it becomes difficult to obtain normal moldings. If the equivalent ratio is more than the above range, the thermal decomposition of a resin composition providing the layer (A) is accelerated to lower the mechanical strength of the obtained moldings.

A resin composition containing EVOH (A1), polyolefin (A3), carboxylic acid-modified polyolefin (A5) and metal compound (A6), which is used for forming the EVOH layer (A) is obtained by using a general known mixer such as a twin-screw extruder. The mixing procedure is not particularly restricted, but it is preferable to mix and melt a molten matter of each of or a mixture of (A1) and (A6) with a solid or molten matter of a mixture of polyolefins (A3) and (A5). For example, a molten matter of either each of or a mixture of (A1) and (A6) and a solid or molten mixture of (A3) and (A5) are previously, separately prepared. Then, the molten mixture (A1+A6) and the molten mixture (A3+A5); the molten mixture (A1+A6) and the solid mixture (A3+A5); the molten matter (A1), the molten mixture (A3+A5) and the molten matter (A6); or the molten matter (A1), the solid mixture (A3+A5) and the melted matter (A6) are mixed and molten to give a resin composition for forming the layer (A).

Concretely, a melt side feed method and a solid side feed method are adoptable. The melt side feed method is a method wherein a portion of the components of a resin composition is made in a melted state, and therewith are mixed the other components in a melted state. For example, the components (A1) and (A6) are melted in a twin-screw extruder at a melting temperature of about 180° to about 250° C., and thereto the components (A3) and (A5) melted at a temperature of about 180° to about 280° C. are fed from a side feed port of the extruder, and they are kneaded to give a uniform composition. This method is particularly useful when the difference in melt viscosity between the mixture (A1+A6) and the mixture (A3+A5) is large.

The solid side feed method is a method wherein components having a higher melting point, e.g., (A1) and (A6), in a resin composition are made in a melted state, components having a lower melting point, e.g., (A3) and (A5), are added thereto in a solid state, and the both are melt-kneaded. For example, after the components (A1) and (A6) are melted in a twin-screw extruder at a temperature of 180° to 280° C., the components (A3) and (A5) are fed to the extruder from the side feed port thereof by a counting feeder and they are kneaded in the extruder to give a uniform composition.

In these mixing procedures, the mixing of the components (A1) and (A6) is preferably carried out by dry-blending them and then melting the mixture, but the molten mixture may be obtained by adding the solid metal compound (A6) to the melted EVOH (A1) and mixing them to give a melted mixture. Also, the components (A1) and (A6) may be added separately. For example, a melted or solid mixture of (A3) and (A5) is added to the melted EVOH (A1), and the metal compound (A6) is added to the resulting mixture and mixed in a melted state.

For the purpose of improving the heat stability in melting and the molding processing stability, (A7) a hindered phenol compound, (A8) an alkaline earth metal salt of an aliphatic carboxylic acid, or (A9) at least one compound selected from the group consisting of an ethylenebis(fatty acid amide), a higher fatty acid metal salt, a high molecular weight ester, a fatty acid ester and a hydrocarbon compound may be incorporated into the EVOH layer (A). The components (A7), (A8) and (A9) may be used alone or in combination thereof.

Examples of the hindered phenol compound (A7) are, for instance, N,N'-hexamethylenebis(3,5-di-t-butyl-4-hydroxyhydrocinnnamamide), 1,1,3-tris(2-methyl-4-hydroxy-5-t-butylphenyl)butane, 1,3,5-trimethyl-2,4,6-tris (3, 5-di-t-butyl-4-hydroxybenzyl)benzene, tetrakis [methylene-3-(3',5'-di-t-butyl-4'-hydroxyphenyl) propionate], n-octadecyl-β-(4'-hydroxy-3', 5'-di-t-butylphenyl)-propionate, 2,2'-methylenebis(4-methyl-6-t-butylphenol), 2,2'-methylenebis(4-ethyl-6-t-butylphenol), 4,4'-thiobis(6-t-butyl-m-cresol), 4,4'-thiobis( 3-methyl-6-t-butylphenol), pentaerythrityl-tetrakis[3-(3,5-di-t-butyl-4-hydroxy-phenyl) propionate], and the like. Preferably, there is selected at least one of N,N'-hexamethylenebis(3,5-di-t-butyl-4-hydroxyhydrocinnamamide), 1,3, 5-trimethyl-2,4,6-tris(3,5-di-t-butyl-4-hydroxybenzyl)benzene and pentaerythrityl-tetrakis[3-(3,5-di-t-butyl-4-hydroxyphenyl) propionate].

Examples of the aliphatic carboxylic acid alkaline earth metal salt (A8) are, for instance, beryllium, magnesium, calcium, strontium and barium salts of aliphatic carboxylic acids having 1 to 9 or more carbon atoms, such as acetic acid, proionic acid, butyric acid, valeric acid, caproic acid and caprylic acid. Particularly, magnesium and calcium salts of aliphatic carboxylic acids having 2 to 4 carbon atoms are useful.

Examples of the compound (A9) are, for instance, ethylenebis($C_{16}$ to $C_{18}$ fatty acid amide) such as ethylenebis (stearylamide); higher fatty acid metal salts, e.g., zinc, aluminum and alkaline earth metal salts of fatty acids having 12 or more carbon atoms, such as zinc stearate, lead stearate, aluminum stearate, calcium stearate and magnesium stearate; high molecular esters such as "Suparm Aceti" made by NOF Corporation, "Hoechst Wax E" made by Hoechst Japan Limited, "Lightol" made by Sanwa Yushi Kabushiki Kaisha and haze wax; fatty acid esters, e.g., fatty acid alkyl esters such as butyl stearate, "Nissan Castor Wax A" made by NOF Corporation, and "TB-121" made by Matsumoto Yushi Seiyaku Kabushiki Kaisha; hydrocarbon compounds, e.g., low molecular weight polyolefins such as polyethylene having a viscosity average molecular weight of 900 to 30,000, and low molecular weight modified polyolefins such as modified polyethylene and modified polypropylene having a viscosity average molecular weight of 1,000 to 20,000 and an acid value of 5 to 100. Preferred are ethylenebis($C_{16}$ to $C_{18}$ fatty acid amide), zinc stearate, lead stearate, calcium stearate, magnesium stearate, and modified polyethylene and polypropylene having a viscosity average molecular weight of 1,000 to 20,000 and an acid value of 5 to 100. Zinc stearate and calcium stearate are particularly preferable.

It is preferable that the amount of the hindered phenol compound (A7) is from 0.01 to 1% by weight, especially 0.03 to 0.9% by weight, more especially 0.05 to 0.8% by weight, based on the total weight of the components (A1) and (A4). When the amount is less than the above range, oxidative thermal deterioration may occur during molding because of lack of oxidation inhibiting property. On the other hand, even if the amount is increased beyond the above range, its effect does not increase so much, and thus is economically disadvantageous.

The amount of the aliphatic carboxylic acid alkaline earth metal salt (A8) is from, in terms of metal, 0.5 to 15 $\mu$moles/g, preferably 1 to 10 $\mu$moles/g, based on the total weight of the components (A1) and (A4). When the amount of the component (A8) is less than the above range, the melt viscosity of a resin composition may rise. If the amount is more than the above range, foaming may occur at the time of molding or the interlaminar strength may be lowered.

The amount of the compound (A9) is preferably from 0.01 to 1% by weight, especially 0.1 to 1% by weight, based on the total weight of the polymer components (A1) and (A4). When the amount of the compound (A9) is less than 0.01% by weight, residue may increase. If the amount is more than 1% by weight, surging frequently occurs during molding, thus laminates having uniform quality are not stably obtained.

The EVOH layer (A) is laminated with a resin composition layer (B) comprising a polyolefin (B1) and an EVOH (B2).

The EVOH (B2) used in the layer (B) must be a hydrolyzed ethylene-vinyl acetate copolymer having an ethylene content of 10 to 70% by mole, preferably 15 to 65% by mole, more preferably 20 to 60% by mole, and having a degree of hydrolysis of at least 85% by mole, preferably at least 90% by mole, more preferably at least 95% by mole. If the ethylene content is less than 10% by mole, the melt moldability is lowered. If the ethylene content is more than 70% by mole, a gas barrier property such as impermeability to organic solvents is not obtained. Also, if the degree of hydrolysis is less than 85% by mole, the gas barrier property and the resistance to organic solvents (volatile compounds comprising hydrocarbons as a main component) are lowered.

The EVOH (B2) may contain a small amount, e.g., up to 15% by mole, especially up to 10% by mole, of a comonomer so long as the properties such as transparency, gas barrier property and solvent resistance are not substantially impaired. Examples of the comonomer are, for instance, an $\alpha$-olefin such as propylene, isobutene, $\alpha$-octene, $\alpha$-dodecene or $\alpha$-octadecene; an unsaturated carboxylic acid, its salt, its partial alkyl ester and its full alkyl ester; a nitrile; an amide; an anhydride; an unsaturated sulfonic acid and its salt; and the like. The EVOH (B2) used in the present invention also comprehends those post-modified by urethanization, acetalization or cyanoethylation within the range substantially not impairing objective effects of the present invention, as well as those modified by copolymerization of the comonomer.

Various kinds of polyolefin resins can be used as the polyolefin resin (B1). Examples of the polyolefin resin (B1) are, for instance, high density polyethylene, medium density polyethylene, low density polyethylene, linear low density polyethylene, ultra low density polyethylene, ethylene copolymers with a comonomer, e.g., vinyl acetate, an acrylic acid ester or an $\alpha$-olefin such as butene, hexene or 4-methyl-1-pentene, polypropylene homopolymer, a graft copolymer of polypropylene and ethylene, propylene copolymer with a comonomer, e.g., an $\alpha$-olefin such as 4-methyl-1-pentene, poly-1-butene, poly-4-methyl-1-pentene, modified polyolefins derived from the above-mentioned polyolefins, e.g., the above-mentioned polyolefins modified by copolymerization or graft polymerization with a monomer such as an unsaturated carboxylic acid or anhydride thereof, a vinylsilane compound or an epoxy group-containing compound, and the like. Preferred are high density polyethylene, medium density polyethylene, low density polyethylene and ultra low density polyethylene.

The resin composition layer (B) is formed from a resin composition containing the polyolefin resin (B1) and 0.5 to 40 parts by weight, preferably 1 to 30 parts by weight, more preferably 2 to 25 parts by weight, of the EVOH (B2) per 100 parts by weight of the polyolefin resin (B1). If the amount of the EVOH (B2) is less than 0.5 part by weight, the gas barrier property and the solvent cracking resistance are lowered. If the amount of the EVOH (B2) is more than 40 parts by weight, the moldability is lowered, and moreover the obtained moldings are poor in low temperature impact resistance. It is desirable that the resin composition layer (B) is in the state that the EVOH (B2) is dispersed into a continuous phase of the polyolefin resin (B1), preferably the EVOH (B2) forms a discontinuous phase in the form of a thin chip, plate or the like.

It is necessary to select the polyolefin resin (B1) and the EVOH (B2) used in the layer (B) so that the ratio of the apparent melt viscosities measured at 230° C. at a rate of shear of 100 $cm^{-1}$ (ratio of the apparent melt viscosity of polyolefin resin to the apparent melt viscosity of EVOH) is from 0.1 to 50, preferably from 0.5 to 20, more preferably from 0.8 to 10. If the apparent melt viscosity ratio (B1/B2) is outside the above range, the dispersibility of EVOH becomes insufficient, so satisfactory gas barrier property and solvent cracking resistance cannot be obtained.

A regrind obtained from scrap, trimming scrap and rejects generated when laminates comprising the polyolefin resin and EVOH are prepared may be used as a mixture of the polyolefin resin (B1) and the EVOH (B2) for the resin composition layer (B). Incorporation of polyolefin resin and EVOH into the regrind may be carried out at the time of use. It is also possible that a master batch in the form of pellets or particles is previously prepared by melt-mixing the polyolefin resin and EVOH, and the regrind is mixed with the master batch and is subjected to melt molding.

A hydrotalcite compound may be added to the regrind in order to secure a long run operability required when the melt molding is conducted continuously for a long time.

In order to improve the compatibility between the polyolefin resin (B1) and the EVOH (B2), the layer (B) may be incorporated with a graft copolymer (B3) prepared by graft-polymerizing an ethylenically unsaturated carboxylic acid or its derivative onto a polyolefin resin and then reacting the resultant with a polyamide. The graft copolymer (B3) composed of a polyolefin resin (B31) as a trunk polymer, an ethylenically unsaturated carboxylic acid or its derivative (B32) and a polyamide (B33) is prepared, for instance, by dissolving or suspending the polyolefin resin (B3 1) in a suitable solvent or melting it, adding an initiator such as a peroxide or azo initiator thereto to activate the polyolefin resin chains, graft-polymerizing the ethylenically unsaturated carboxylic acid or its derivative (B32) onto the polyolefin resin (B31), and mixing the resulting graft copolymer with the polyamide (B33) in the molten state.

Examples of the polyolefin resin (B31) are, for instance, low density polyethylene, medium density polyethylene, high density polyethylene, linear low density polyethylene, linear medium density polyethylene, linear high density polyethylene, ionomer, ethylene-propylene block or random copolymer, crystalline polypropylene, polybutene, ethylene-vinyl acetate copolymer, ethylene-acrylic acid ester copolymer, and the like. In particular, linear low density polyethylene, low density polyethylene, medium density polyethylene, high density polyethylene, ethylene-propylene block or random copolymer, ethylene-vinyl acetate copolymer and crystalline polypropylene are preferable in practical use.

Examples of the ethylenically unsaturated carboxylic acid or its derivative (B32) to be grafted onto such trunk polymer are, for instance, acrylic acid, methacrylic acid, crotonic acid, maleic acid, fumaric acid, itaconic acid and other unsaturated carboxylic acids, and anhydrides and half esters thereof.

The polyamides (B33) used in the preparation of the graft copolymer (B3) are those prepared by known methods such as polyaddition of a lactam, polycondensation of an aminocarboxylic acid, and polycondensation of a diamine and a dicarboxylic acid. The raw materials used for the preparation of the polyamides include, for instance, a lactam such as ε-caprolactam, enanthlactam, capryllactam, lauryllactam, α-pyrrolidone or α-piperidone; an ω-amino acid such as 6-aminocaproic acid, 7-amino-heptanoic acid, 9-aminononanoic acid or 11-aminoundecanoic acid; a dibasic acid such as adipic acid, glutaric acid, pimelic acid, suberic acid, azelaic acid, sebacic acid, undecanedioic acid, dodecanedioic acid, hexadecanedioic acid, hexadecenedioic acid, eicosanedioic acid, eicosadienedioic acid, diglycolic acid, 2,2,4-trimethyladipic acid, xylylene dicarboxylic acid, 1,4-cyclohexane dicarboxylic acid, terephthalic acid or isophthalic acid; and a diamine such as hexamethylenediamine, tetramethylenediamine, nonamethylenediamine, undecamethylenediamine, dodecamethylenediamine, 2,2,4- or 2,4,4-trimethylhexamethylenediamine, bis(4,4'-aminocyclohexyl)methane or m-xylenediamine. A monoamine such as laurylamine or oleylamine may be suitably used for the purpose of controlling the molecular weight.

In the preparation of the graft copolymer (B3), Brabender mixing machine, bathblender, single-screw extruder, twin-screw extruder such as Werner type or Pfleiderer type extruder, and the like are used.

The polyolefin resins (B31) used as the trunk polymer for the graft coplymer (B3) are preferably selected from those having a degree of polymerization of about 350 to about 45,000, especially about 500 to about 10,000, and having a melt index (measured at 230° C. under a load of 2,160 g) of about 0.1 to about 50 g/10 minutes.

The reaction ratio of the polyolefin resin (B31) to the ethylenically unsaturated carboxylic acid or its derivative (B32) is from 100/0.05 to 100/10 by weight, preferably 100/0.3 to 100/3 by weight. If the (B31)/(B32) ratio is less than 100/0.05 by weight, the compatibility improving effect of the graft copolymer is insufficient. If the ratio is more than 100/10 by weight, the viscosity of a resin composition markedly increases in molding processing, thus such a graft copolymer is impractical.

Polyamides having a degree of polymerization of at most 1,000, especially about 50 to about 500, are preferable as the polyamide. (B33) used in the preparation of the graft copolymer (B3). The amount of the polyamide (B33) is from 0.01 to 1 mole, preferably 0.05 to 0.9 mole, per a carboxyl group.

Other polymers than the polyamide (B33) may be added to the reaction system at the time of reacting the intermediately produced graft copolymer with the polyamide, as occasion demands.

The manner for preparing the resin composition for the layer (B) is not particularly restricted. For example, there are adoptable (1) a method wherein the EVOH and the polyolefin resin are melt-blended in a single-screw or multi-screw extruder, and (2) a method wherein the resins are dry-blended by a rotational mixing machine or the like. The method (1) is practical.

A polyolefin resin layer (C) is disposed on at least the outer side of the EVOH layer (A). The layer (C) of a different or same polyolefin resin may also be disposed on the other side, namely on the outer side of the layer (B).

Polyolefin resins exemplified for the layer (B), namely polyolefin resins (B1), can be used as the polyolefin resins for the layer (C).

The laminates of the present invention have a basic layered structure of (C)/(A)/(B) or (C)/(A)/(B)/(C). The method for the preparation of the laminates is not particularly limited, and there are adoptable various known methods, e.g., coextrusion lamination, melt extrusion lamination, dry lamination wherein films or sheets for respective layers are laminated using an adhesive resin, coextrusion, coinjection molding, coextrusion inflation molding, solution coating method (lay-up molding), and the like.

Usually, an adhesive resin layer is provided between the layer(C) and the layer (A) and between the layer (A) and the layer (B). Polyolefin resins modified with an unsaturated carboxylic acid or its anhydride are used as the adhesive resins. An unsaturated carboxylic acid-modified or its anhydride-modified ethylene-α-olefin copolymer having a density of 0.86 to 0.95 g/cm$^3$ is preferred as the adhesive resin. Such resins can be obtained by modifying polyolefin resins as those exemplified for the polyolefin resin (B1), e.g., copolymers of a predominant amount of ethylene and an α-olefin such as butene, hexene or 4-methyl-1-pentene, with an unsaturated carboxylic acid or its anhydride. The modification is conducted by copolymerization of the monomers or graft polymerization of the unsaturated carboxylic acid or its anhydride onto the polyolefin resins. The modification product of course may contain the modified polymer, the unmodified polymer and the carboxylic acid or its anhydride or homopolymer thereof.

Examples of the unsaturated carboxylic acid and its anhydride used for the modification are, for instance, maleic acid, maleic anhydride, fumaric acid, acrylic acid, methacrylic acid, crotonic acid, itaconic acid, citraconic acid, hexahydrophthalic anhydride, and the like.

The content of the unsaturated carboxylic acid or its anhydride in the modified ethylene-α-olefin copolymer is from 0.001 to 10% by weight, preferably 0.01 to 5% by weight. If the carboxylic acid content in the modified copolymer is small, the adhesive force is lowered, and if the content is large, a crosslinking reaction occurs, resulting in deterioration of moldability.

The laminate of the present invention can be formed into not only films and sheets, but also pipe, tubes, containers such as tanks or bottles, and other shaped articles by the above-mentioned coextrusion, coinjection molding, coextrusion inflation molding, blow molding and the like. Also, the laminate can be heated again at a temperature of about 100° to about 150° C. and stretched by a blow stretching method.

The thickness of each layer of the laminate (C)/(A)/(B) or (C)/(A)/(B)/(C) varies depending on the uses and the properties requied therefor. In general, the thicknesses are selected from 30–10,000 μm /5–2,000 μm /30–10,000 μm/30–10,000 μm, preferably 50–7,000 μm /10–500 μm/50–7,000 μm/50–7,000 μm, for (C)/(A)/(B)/(C). The thicknesses of the respective layers of the laminate (C)/(A)/(B) are the same as those of the layers (C), (A) and (B) for the laminate (C)/(A)/(B)/(C). The layers are arranged in the order of (C), (A), (B) and (C) from the inner side toward the outer side of molded articles. It is preferable that the EVOH layer (A) is located at the position of 20 to 60%, especially 25 to 55%, of the whole thickness apart from the inner side.

The laminates in the form of a container of the present invention are useful for storage, transportation or the like of volatile materials composed mainly of hydrocarbons, e.g., isooctane, thinner, machine oil, silicone oil, toluene, benzene, xylene and other organic solvents, agricultural chemicals, reagents, and kerosene, light oil, heavy oil, gasoline and other fuel oils.

In addition to the basic structure of (C)/(A)/(B) or (C)/(A)/(B)/(C) which may further include adhesive layer or layers between the respective layers, the laminates of the present invention may have a structure of (C)/(A)/(B)/(A)/(C), a structure of (C)/(B) /(A)/(B)/(C), and the like.

Each layer of the laminates of the present invention may further contain usual additives as used for plastics for improving molding processability, physical properties and the like, e.g., antioxidants lubricants, hydrotacite group compounds, antistatic agents, plasticizers, colorants, ultraviolet absorber, inorganic and organic fillers, and the like.

The present invention is more specifically described and explained by means of the following Examples in which all parts and % are by weight unless otherwise noted.

The following ingredients were used in the Examples.
EVOH (A1)
A1-1: EVOH having an ethylene content of 29% by mole, a degree of hydrolysis of 99.6% by mole, an apparent melt viscosity of 12,000 poises and a melt index (MI) of 3 g/10 minutes
A1-2: EVOH having an ethylene content of 32% by mole, a degree of hydrolysis of 99.6% by mole, an apparent melt viscosity of 11,000 poises and an MI of 3 g/10 minutes
A1-3: EVOH having an ethylene content of 29% by mole, a degree of hydrolysis of 99.6% by mole, an apparent melt viscosity of 7,000 poises and an MI of 8 g/10 minutes The apparent melt viscosity shown above is the value measured at 230° C. and a rate of shear of 100 cm$^{-1}$ by Capirograph (trade mark) made by Toyo Seiki Kabushiki Kaisha using an orifice having a length of 10 mm and a diameter of 1 mm. The MI shown above denotes a melt flow index measured at 210° C.

Boron compound A2
A2-1: Boric acid
Polyolefin resin (A3)
A3-1: Ultra low density polyethylene having a density of 0.905 g/cm$^3$ and an MI of 1 g/10 minutes
A3-2: Linear low density polyethylene having a density of 0.918 g/cm$^3$ and an MI of 2 g/10 minutes
The MI shown above denotes a melt flow index measured at 210° C. under a load of 2,160 g.
Terminal-controlled polyamide resin (A4)
A4-1: Nylon 6
  Terminal COOH group: 9 μeq/g of polymer (100×y)/(x+y)=87
  MI: 2.5 g/10 minutes (230° C., 2,160 g)
A4-2: Nylon 6/66 (nylon 66 component: 25% by weight)
  Terminal COOH group: 3 μeq/g of polymer (100×y)/(x+y)=94
  MI: 11.2 g/10 minutes (230° C., 2,160 g)
A4-3: Nylon 6
  Terminal COOH group: 20 μeq/g of polymer (100×y)/(x+y)=60
  MI: 3.6 g/10 minutes (230° C., 2,160 g)
Carboxylic acid-modified polyolefin resin (A5)
A5-1: Ultra low density polyethylene modified with 3% of maleic anhydride (MI: 11 g/10 minutes)
A5-2: Ultra low density polyethylene modified with 3% of acrylic acid (MI: 2.5 g/10 minutes)
A5-3: High density polyethylene modified with 3% of maleic anhydride (MI: 4 g/10 minutes)
The MI shown above denotes a melt flow index measured at 190° C. under a load of 2,160 g.
Metal compound (A6)
A6-1: Magnesium oxide
A6-2: Magnesium hydroxide
A6-3: Magnesium acetate
Resin composition I for layer (A)
  To a twin-screw extruder were fed 100 parts of EVOH (A1-1) and 0.4 part of magnesium oxide (A6-1), and were melted at 230° C. A blend of 25 parts of carboxylic acid-modified polyolefin resin (A5-1) and 75 parts of polyolefin resin (A3-1) was previously melted in a single-screw extruder at 230° C., and was fed to the twin-screw extruder from a side feed port thereof so that the ratio of EVOH (A1-1)/polyolefin blend (A3-1)+(A5-1) was 60/40 by weight. The both were uniformly kneaded by the twin-screw extruder and extruded to give resin pellets to be used for the layer (A). The number of equivalents of the metal compound (A6) based on carbonyl groups in the carboxylic acid-modified polyolefin resin (A5) was 1.0. Also, the number of equivalents of carbonyl groups in 100 g of the polyolefin blend (A3+A5) was 0.015.
Resin composition II for layer (A)
  To a twin-screw extruder were fed 100 parts of EVOH (A1-2) and 0.4 part of magnesium hydroxide (A6-2), and were melted at 230° C. A blend of 30 parts of carboxylic acid-modified polyolefin resin (A5-2) and 70 parts of polyolefin resin (A3-1) was previously melted in a single-screw extruder at 230° C., and was fed to the twin-screw extruder from a side feed port thereof so that the ratio of EVOH (A1-2)/polyolefin blend (A3-1)+(A5-2) was 60/40 by weight. The both were uniformly kneaded by the twin-screw extruder and extruded to give resin pellets to be used for the layer (A). The number of equivalents of the metal compound (A6) based on carbonyl groups in the carboxylic acid-modified polyolefin resin (A5) was 1.94. Also, the number of equivalents of carbonyl groups in 100 g of the polyolefin blend (A3+A5) was 0.008.

Resin composition III for layer (A)

To a twin-screw extruder were fed 100 parts of EVOH (A1-3) and 1.35 parts of magnesium acetate (A6-3), and were melted at 230° C. A blend of 25 parts of carboxylic acid-modified polyolefin resin (A5-1) and 75 parts of polyolefin resin (A3-1) was previously melted in a single-screw extruder at 230° C., and was fed to the twin-screw extruder from a side feed port thereof so that the ratio of EVOH (A1-3)/polyolefin blend (A3-l)+(A5-1) was 60/40 by weight. The both were uniformly kneaded by the twin-screw extruder and extruded to give resin pellets to be used for the layer (A). The number of equivalents of the metal compound (A6) based on carbonyl groups in the carboxylic acid-modified polyolefin resin (A5) was 1.86. Also, the number of equivalents of carbonyl groups in 100 g of the polyolefin blend (A3+A5) was 0.01.

Resin composition IV for layer (A)

To a twin-screw extruder were fed 100 parts of EVOH (A1-1) and 1.3 parts of magnesium acetate (A6-3), and were melted at 230° C. A blend of 30 parts of carboxylic acid-modified polyolefin resin (A5-3) and 70 parts of polyolefin resin (A3-2) was previously melted in a single-screw extruder at 230° C., and was fed to the twin-screw extruder from a side feed port thereof so that the ratio of EVOH (A1-1)/polyolefin blend (A3-2)+(A5-3) was 70/30 by weight. The both were uniformly kneaded by the twin-screw extruder and extruded to give resin pellets to be used for the layer (A). The number of equivalents of the metal compound (A6) based on carbonyl groups in the carboxylic acid-modified polyolefin resin (A5) was 2.1. Also, the number of equivalents of carbonyl groups in 100 g of the polyolefin blend (A3+A5) was 0.01.

Resin composition V for layer (A)

A blend of 100 parts of EVOH (A1-1) and 30 parts of polyolefin resin (A3-1) was uniformly kneaded by a twin-screw extruder, and was extruded to give resin pellets to be used for the layer (A).

Hindered phenol compound (A7)

A7-1: N,N'-Hexamethylenebis(3,5-di-t-butyl-4-hydroxyhydro-cinnamamide) commercially available under the trade mark "Irganox" 1098 made by Ciba-Geigy AG A7-2: 1,3,5-Trimethyl-2,4,6-tris(3,5-di-t-butyl-4-hydroxybenzyl) benzene commercially available under the trade mark "Irganox" 1330 made by Ciba-Geigy AG A7-3: Pentaerythrityl-tetrakis[3-(3,5-di-t-butyl-4-hydroxypheny) propionate] commercially available under the trade mark "Irganox" 1010 made by Ciba-Geigy AG Aliphatic carboxylic acid alkaline earth metal salt (A8)

A8-1: Magnesium acetate tetrahydrate
A8-2: Calcium propionate
A8-3: Magnesium butyrate Compound (A9)

A9-1: Ethylenebis(stearylamide)
A9-2: Polyethylene having a viscosity average molecular weight of 3,200 and an acid value of 20 KOHmg/g
A9-3: Zinc stearate
A9-4: Magnesium stearate
A9-5: Mixed metal soap of zinc stearate/calcium stearate =1/0.5 by weight

EVOH (B2)

B2-1: EVOH having an ethylene content of 29% by mole, a degree of hydrolysis of 99.6% by mole, an apparent melt viscosity of 12,000 poises and a melt index (MI) of 3 g/10 minutes B2-2: EVOH having an ethylene content of 32% by mole, a degree of hydrolysis of 99.6% by mole, an apparent melt viscosity of 11,000 poises and an MI of 3 g/10 minutes B2-3: EVOH having an ethylene content of 29% by mole, a degree of hydrolysis of 99.6% by mole, an apparent melt viscosity of 7,000 poises and an MI of 8 g/10 minutes.

The apparent melt viscosity shown above is the value measured at 230° C. and a rate of shear of 100 $cm^{-1}$.

Polyolefin resin (B1)

B1-1: High density polyethylene (commercially available under the trade mark "Hizex" HZ8200B made by Mitsui Petrochemical Industries, Ltd.) having a density of 0.956 $g/cm^3$ and an apparent melt viscosity of 30,000 poises B1-2: High density polyethylene (commercially available under the trade mark "Showlex" 4551H made by Showa Denko Kabushiki Kaisha) having a density of 0.945 $g/cm^3$ and an apparent melt viscosity of 30,000 poises.

The apparent melt viscosity shown above is the value measured at 230° C. and a rate of shear of 100 $cm^{-1}$.

Graft copolymer B3

B3-1: Graft copolymer of an ethylene-propylene block copolymer (B31) (MI 4.2 g/10 minutes, ethylene content 12% by weight), maleic anhydride (B32) and a poly-$\epsilon$-caprolactum polyamide (B33) degree of polymerization 200) wherein the (B31)/(B32) ratio is 100/2.1 by weight and the (B33)/(B32) ratio is 1/2 by mole 3-2: Graft copolymer of an ethylene-propylene random copolymer (B31) (MI 3.6 g/10 minutes, ethylene content 3% by weight), maleic anhydride (B32) and a poly-$\epsilon$-caprolactum polyamide (B33) degree of polymerization 450) wherein the (B31)/(B32) ratio is 100/0.8 by weight and the (B33)/(B32) ratio is 1/4 by mole B3-3: Graft copolymer of an ethylene-propylene copolymer (B31) (MI 27 g/10 minutes, ethylene content 12% by weight), maleic anhydride (B32) and a poly-$\epsilon$-caprolactum polyamide (B33) degree of polymerization 320) wherein the (B31)/(B32) ratio is 100/1 by weight and the (B33)/(B32) ratio is 1/5 by mole.

The MI shown above is a melt flow index measured at 210° C.

Adhesive resin

D-1: Modified polyolefin resin commercially available under the trade mark "Admer" NF450A made by Mitsui Petrochemical Industries, Ltd.

EXAMPLE 1

A multi-layer bottle (volume: about 500 ml) having a structure of inner layer (C) 300 $\mu$m /adhesive layer (D) 100 $\mu$m/(A) 100 $\mu$m/adhesive layer (D) 100 $\mu$A/(B) 350 $\mu$m /outer layer (C) 150 $\mu$m was prepared by an coextrusion multi-layer direct blow molding machine using the following resins in the respective layers.

Layer (A): EVOH A1-1

Layer (B): Resin composition comprising 100 parts of polyolefin resin B1-1 and 15 parts of EVOH B2-1 (the ratio of B1-1/B2-1 in apparent melt viscosity measured at 230° C. at a rate of shear of 100 $cm^{-1}$: 2.5)

Inner and outer layers (C): Polyolefin resin B1-1

Adhesive layers (D): Adhesive resin D-1.

The EVOH layer (A) was located at the position between about 36% and about 45% of the full thickness in the direction of the inside toward the outside.

The bottle was filled with toluene, sealed and allowed to stand at 40°±2° C. for 7 days. The amount of permeation of toluene at 40°±2° C. determined by measuring the change in weight of the bottle was 0.004 g/day.

The bottle filled with toluene was also allowed to stand at 400°±2° C. for 8 weeks, and the amount of permeation of toluene after the storage was measured again. The amount of permeation was 0.004 g/day.

The cross section of this bottle allowed to stand for 8 weeks was observed by a microscope. No generation of stress crack owing to the solvent was observed.

EXAMPLES 2 to 6

Bottles were prepared using the resins shown in Table 1 and estimated in the same manner as in Example 1, provided that in Examples 4 and 5 the thicknesses of the layers were inner layer (C) 300 μm /adhesive layer (D) 100 μm/(A) 100 μm/adhesive layer (D) 100 μm/(B) 500 μm/outer layer (C) 200 μm (the EVOH layer (A) was located in the position between about 31% and 38% of the full thickness in the direction of the inside toward the outside).

The results are shown in Table 2 together with the results of Example 1.

TABLE 1

|  | Resins used in respective layers | | | Apparent melt viscosity ratio |
|---|---|---|---|---|
|  | Layer A | Layer B* | Layer C | Layer D | in layer B |
| Ex.1 | A1-1 | B1-1/B2-1 (100/15) | B1-1 | D-1 | 2.5 |
| Ex.2 | A1-2 | B1-1/B2-2 (100/20) | B1-1 | D-1 | 2.7 |
| Ex.3 | A1-3 | B1-2/B2-3 (100/15) | B1-2 | D-1 | 4.3 |
| Ex.4 | A1-1 | B1-1/B2-1 (100/15) | B1-1 | D-1 | 2.5 |
| Ex.5 | A1-1 | B1-1/B2-1 (100/10) | B1-1 | D-1 | 2.5 |
| Ex.6 | Al-1 | B1-1/B2-2 (100/20) | B1-2 | D-1 | 2.7 |

Note *The ratio in the parentheses denotes the weight ratio of polyolefin B1/EVOH B2.

COMPARATIVE EXAMPLE 1

The procedure of Example 1 was repeated except that the layer (A) was omitted to give a multi-layer bottle having a structure of inner layer (C) 600 μm /adhesive layer (D) 100 μm/(B) 350 μm/outer layer (C) 150 μm.

The results are shown in Table 2.

COMPARATIVE EXAMPLE 2

The procedure of Example 1 was repeated except that the layer (B) was omitted to give a multi-layer bottle having a structure of inner layer (C) 300 μm/adhesive layer (D) 100 μm/(A) 100 μm/adhesive layer (D) 100 μm/outer layer (C) 500 μm, wherein the EVOH layer (A) was located at the position between about 36% and about 45% of the full thickness in the direction of the inside toward the outside.

The results are shown in Table 2.

TABLE 2

|  | Amount of permeation of toluene (g/day) | | Generation of stress cracks |
|---|---|---|---|
|  | After storage for 7 days | After storage for 8 weeks |  |
| Ex.1 | 0.004 | 0.004 | no generation |
| Ex.2 | 0.005 | 0.005 | no generation |
| Ex.3 | 0.004 | 0.004 | no generation |
| Ex.4 | 0.004 | 0.004 | no generation |
| Ex.5 | 0.006 | 0.006 | no generation |
| Ex.6 | 0.005 | 0.005 | no generation |
| Com. Ex.1 | 0.25 | 0.30 | no generation |
| Com. Ex.2 | 0.02 | 0.20 | generation of cracks |

EXAMPLE 7

A multi-layer bottle (volume: about 500 ml) having a structure of inner layer (C) 300 μm/adhesive layer (D) 100 μm/(A) 100 μm/adhesive layer (D) 100 μm/(B) 350 μm/outer layer (C) 150 μm was prepared by an coextrusion multi-layer direct blow molding machine using the following resins in the respective layers.

Layer (A): Resin composition comprising EVOH (A1) and boron compound A2 shown in Table 3

Layer (B): Resin composition comprising polyolefin resin B1 and EVOH B2 shown in Table 3

Inner and outer layers (C): Polyolefin resin B1-1

Adhesive layers (D): Adhesive resin D-1

The EVOH layer (A) was located at the position between about 36% and about 45% of the full thickness in the direction of the inside toward the outside.

The bottle was filled with toluene, sealed and allowed to stand at 40°±2° C. for 7 days. The amount of permeation of toluene at 40°±2° C. determined by measuring the change in weight of the bottle was 0.004 g/day.

The bottle filled with toluene was also allowed to stand at 400°±2° C. for 8 weeks, and the amount of permeation of toluene after the storage was measured again. The amount of permeation was 0.004 g/day.

The cross section of this bottle allowed to stand for 8 weeks was observed by an optical microscope. No generation of stress cracks owing to the solvent was observed.

The bottle allowed to stand for 8 weeks which was filled with toluene was caused to fall down from the height of 5 m onto a concrete surface at −40° C. in order to estimate the low temperature impact resistance. Destruction of bottle (visual observation) were observed and cracking of bottle surface and section (optical microscopic observation).

EXAMPLES 8 to 12

Bottles were prepared using the resins shown in Table 3 and estimated in the same manner as in Example 7, provided that in Examples 10 and 11 the thicknesses of the layers were inner layer (C) 300 μm/adhesive layer (D) 100 μm/(A) 100 μm/adhesive layer (D) 100 μm/(B) 500 μm/outer layer (C) 200 μm (the EVOH layer (A) was located in the position between about 31% and 38% of the full thickness in the direction of the inside toward the outside).

The procedure of Example 7 was also repeated except that boric acid (A2-1) was not incorporated into the layer (A) to form a layer (A) made of only EVOH (A1). That is to say, the same bottle as that of Example 1 was prepared.

The results are shown in Table 4 together with the results of Examples 1 and 7.

TABLE 3

| | Resins used in respective layers | | | | Amount of boron based on EVOH in layer A (%) |
|---|---|---|---|---|---|
| | Layer A*1 | Layer B*1 | Layer C | Layer D | |
| Ex.7 | A1-1/A2-1 (100/0.05) | B1-1/B2-1 (100/15) | B1-1 | D-1 | 0.009 |
| Ex.8 | A1-2/A2-1 (100/0.05) | B1-1/B2-2 (100/20) | B1-1 | D-1 | 0.009 |
| Ex.9 | A1-1/A2-1 (100/0.1) | B1-1/B2-2*2 (100/5) | B1-1 | D-1 | 0.017 |
| Ex.10 | A1-1A2-1 (100/0.05) | B1-1/B2-1 (100/15) | B1-1 | D-1 | 0.009 |
| Ex.11 | A1-1/A2-1 (100/0.1) | B1-1/B2-3 (100/10) | B1-1 | D-1 | 0.017 |
| Ex.12 | A1-1/A2-1 (100/0.2) | B1-1/B2-2 (100/20) | B1-2 | D-1 | 0.035 |

Notes
*1The ratio in the parentheses denotes the weight ratio of EVOH A1/boron compound A2 or polyolefin B/EVOH B2.
*2The component B2 used in Example 9 was the same as the resin composition used for the layer (A), namely a mixture of EVOH (A1-1) and boron compound A2-1 in a ratio of 100/0.1 by weight.

COMPARATIVE EXAMPLE 3

The procedure of Example 7 was repeated except that EVOH B2-1 was incorporated into the layer (B) in an amount of 0.1 part based on polyolefin B1-1.

The results are shown in Table 4.

COMPARATIVE EXAMPLE 4

The procedure of Example 7 was repeated except that EVOH B2-1 was incorporated into the layer (B) in an amount of 50 parts based on polyolefin B1-1.

The results are shown in Table 4.

TABLE 4

| | Amount of permeation of toluene (g/day) | | Generation of stress cracks | Low temperature impact resistance |
|---|---|---|---|---|
| | After storage for 7 days | After storage for 8 weeks | | |
| Ex.7 | 0.004 | 0.004 | none | good |
| Ex.8 | 0.005 | 0.005 | none | good |
| Ex.9 | 0.004 | 0.004 | none | good |
| Ex.10 | 0.004 | 0.004 | none | good |
| Ex.11 | 0.006 | 0.006 | none | good |
| Ex.12 | 0.006 | 0.006 | none | good |
| Ex.1 | 0.004 | 0.004 | none | generation of cracks in section |
| Com Ex.3 | 0.006 | 0.20 | generation | generation of cracks in section |
| Com. Ex.4 | 0.002 | 0.002 | none | breakage of bottle |

Example 13

A multi-layer bottle (volume: about 500 ml) having a structure of inner layer (C) 300 μm/adhesive layer (D) 100 μm/(A) 100 μm/adhesive layer (D) 100 μm/(B) 350 μm/outer layer (C) 150 μm was prepared by an coextrusion multi-layer direct blow molding machine using the following resins in the respective layers.

Layer (A): Resin composition comprising the components (A1), (A4), (A7), (A8) and (A9) shown in Table 5
Layer (B): Resin composition comprising polyolefin resin B1 and EVOH B2 shown in Table 5
Inner and outer layers (C): Polyolefin resin B1
Adhesive layers (D): Adhesive resin D-1

The EVOH layer (A) was located at the position between about 36% and about 45% of the full thickness in the direction of the inside toward the outside.

The bottle was filled with toluene and sealed. The amount of permeation of toluene at 40°±2° C. determined by measuring the change in weight of the bottle was 0.005 g/day.

The bottle filled with toluene was stored at 40°±2° C. for 8 weeks, and the amount of permeation of toluene after the storage was measured again. The amount of permeation was 0.005 g/day.

The cross section of this bottle allowed to stand for 8 weeks was observed by an optical microscope. No generation of stress cracks owing to the solvent was observed.

The bottle stored for 8 weeks which was filled with toluene was cause to fall down from the height of 5 m onto a concrete surface at −40° C. in order to estimate the low temperature impact resistance. Destruction of bottle (visual observation) and cracking of bottle surface and section (optical microscopic observation) were not observed.

EXAMPLES 14 to 25 and Comparative Examples 5 to 7

Bottles were prepared using the resins shown in Table 5 and estimated in the same manner as in Example 13, provided that in Examples 16 and 17 the thicknesses of the layers were inner layer (C) 300 μm /adhesive layer (D) 100 μ/(A) 100 μm/adhesive layer (D) 100 μm/(B) 500 μm/outer layer (C) 200 μm (the EVOH layer (A) was located in the position between about 31% and 38% of the full thickness in the direction of the inside toward the outside).

The results are shown in Table 5 together with the results of Examples 1 and 13.

In Table 5, the amounts of the hindered phenol compound (A7) and the compound (A9) denote those based on the total weight of the components (A1) and (A4), and the value shown after the metal of the aliphatic carboxylic acid alkaline earth metal salt (A8) denotes the amount of the metal (μmole/g) based on the total weight of the components (A1) and (A4).

TABLE 5

| Example No. | Example 13 | Example 14 | Example 15 | Example 16 |
|---|---|---|---|---|
| Components and amounts thereof (part) | | | | |
| A1 | A1-1 90 | A1-1 80 | A1-1 70 | A1-2 70 |
| A4 | A4-1 10 | A4-1 20 | A4-1 30 | A4-1 30 |
| A9 | A7-1 4000 ppm | A7-3 4000 ppm | A7-2 8000 ppm | A7-1 4000 ppm |
| A8 | A8-1 Mg 3.5 | A8-1 Mg 2.0 | A8-3 Mg 2.3 | A8-2 Ca 6.0 |
| A7 | A9-5 1700 ppm | A9-5 1500 ppm | A9-3 1300 ppm | A9-4 1500 ppm |
| B1 | B1-1 100 | B1* 100 | B1-2 100 | B1-1 100 |
| B2 | B2-1 15 | B2-1 20 | B2-2 15 | B2-2 15 |
| C | B1-1 | B1-1 | B1-2 | B1-1 |
| D | D-1 | D-1 | D-1 | D-1 |
| Permeation of toluene (g/day) | | | | |
| Before storage | 0.005 | 0.006 | 0.007 | 0.007 |
| After storage | 0.005 | 0.006 | 0.007 | 0.007 |
| Stress cracking resistance | good | good | good | good |
| Low temp. impact resistance | good | good | good | good |

| Example No. | Example 17 | Example 18 | Example 19 | Example 20 | Example 21 |
|---|---|---|---|---|---|
| Components and amounts thereof (part) | | | | | |
| A1 | A1-1 90 | A1-1 90 | A1-1 90 | A1-1 90 | A1-1 90 |
| A4 | A4-2 10 | A4-3 10 | A4-1 10 | A4-1 10 | A4-2 10 |
| A7 | A7-2 1000 ppm | A7-3 4000 ppm | — | A7-3 5000 ppm | — |
| A8 | A8-1 Mg 2.0 | A8-2 Ca 4.0 | — | — | A8-1 Mg 8.0 |
| A9 | A9-2 5000 ppm | A9-1 5000 ppm | — | — | — |
| B1 | B1-1 100 | B1-1 100 | B1-1 100 | B1-1 100 | B1-1 100 |
| B2 | B2-1 10 | B2-2 20 | B2-1 10 | B2-1 10 | B2-1 10 |
| C | B1-1 | B1-2 | — | B1-1 | B1-1 |
| D | D-1 | D-1 | D-1 | D-1 | D-1 |
| Permeation of toluene (g/day) | | | | | |
| Before storage | 0.005 | 0.004 | 0.007 | 0.005 | 0.005 |
| After storage | 0.005 | 0.004 | 0.009 | 0.005 | 0.005 |
| Stress cracking resistance | good | good | good | good | good |
| Low temp. impact resistance | good | good | good | good | good |

| Example No. | Example 22 | Example 23 | Example 24 | Example 25 |
|---|---|---|---|---|
| Components and amounts thereof (part) | | | | |
| A1 | A1-1 90 | A1-1 90 | A1-1 90 | A1-1 90 |
| A4 | A4-3 10 | A4-1 10 | A4-1 10 | A2-2 10 |
| A7 | — | A7-3 4000 ppm | A7-3 4000 ppm | — |
| A8 | — | A4-1 Mg 3.5 | — | A8-1 Mg 2.0 |
| A9 | A5-1 5000 ppm | — | A5-4 3000 ppm | A9-1 5000 ppm |
| B1 | B1-1 100 | B1-1 100 | B1-1 100 | B1-1 100 |
| B2 | B2-2 20 | B2-1 10 | B2-1 10 | B2-1 10 |
| C | B1-2 | — | B1-1 | B1-1 |
| D | D-1 | D-1 | D-1 | D-1 |
| Permeation of toluene (g/day) | | | | |
| Before storage | 0.004 | 0.005 | 0.005 | 0.006 |
| After storage | 0.004 | 0.005 | 0.005 | 0.006 |
| Stress cracking resistance | good | good | good | good |
| Low temp. impact resistance | good | good | goqd | good |

TABLE 5-continued

| Example No. | Example 1 | Com. Ex. 5 | Com. Ex. 6 | Com. Ex. 7 |
|---|---|---|---|---|
| Components and amounts thereof (part) | | | | |
| A1 | A1-1 100 | — | A1-1 90 | A1-1 90 |
| A4 | — | A4-1 100 | A4-1 10 | A4-1 10 |
| A7 | — | — | A7-1 4000 ppm | A7-1 4000 ppm |
| A8 | — | — | A8-1 Mg 3.5 | A8-1 Mg 3.5 |
| A9 | — | — | A9-5 1700 ppm | A9-5 1700 ppm |
| B1 | B1-1 100 | B1-1 100 | B1-1 100 | B1-1 100 |
| B2 | B2-1 15 | B2-1 15 | — | B2-1 50 |
| C | B1-1 | B1-1 | B1-1 | B1-1 |
| D | D-1 | D-1 | D-1 | D-1 |
| Permeation of toluene (g/day) | | | | |
| Before storage | 0.004 | 0.08 | 0.007 | 0.003 |
| After storage | 0.004 | 0.08 | 0.20 | 0.063 |
| Stress cracking resistance | good | good | cracking | good |
| Low temp. impact resistance | cracking | good | cracking | breakage |

(Note) * A mixture of polyolefin B1-1 and maleic anhydride-modified polyethylene in a ratio of 100/5 by weight.

EXAMPLE 26

A multi-layer bottle (volume: about 500 ml) having a structure of inner layer (C) 300 $\mu$m/adhesive layer (D) 100 $\mu$m/(A) 100 $\mu$m/adhesive layer (D) 100 $\mu$m/(B) 350 $\mu$m/outer layer (C) 150 $\mu$m was prepared by an coextrusion multi-layer direct blow molding machine using the following resins in the respective layers.

Layer (A): Resin composition I
Layer (B): Resin composition comprising 100 parts of polyolefin resin B1-1 and 15 parts of EVOH B2-1 (the ratio of B1-1/B2-1 in apparent melt viscosity measured at 230° C. at a rate of shear of 100 cm$^{-1}$: 2.5)
Inner and outer layers (C): Polyolefin resin B1-1
Adhesive layers (D): Adhesive resin D-1

The EVOH layer (A) was located at the position between about 36% and about 45% of the full thickness in the direction of the inside toward the outside.

The bottle was filled with toluene, sealed and allowed to stand at 40°±2° C. for 7 days. The amount of permeation of toluene at 40°±2° C. determined by measuring the change in weight of the bottle was 0.007 g/day.

The bottle filled with toluene was allowed to stand at 40°±2° C. for 8 weeks, and the amount of permeation of toluene was measured again. The amount of permeation was 0.007 g/day.

The cross section of this bottle allowed to stand for 8 weeks was observed by an optical microscope. No generation of stress crack owing to the solvent was observed.

The bottle allowed to stand for 8 weeks which was filled with toluene was caused to fall down from the height of 5 m onto a concrete surface at −40° C. in order to estimate the low temperature impact resistance. Destruction of bottle (visual observation) and cracking of bottle surface and section (optical microscopic observation) were not observed.

EXAMPLES 27 to 36

Bottles were prepared using the resins shown in Table 6 and estimated in the same manner as in Example 26, provided that in Examples 29 and 30 the thicknesses of the layers were inner layer (C) 300 $\mu$m/adhesive layer (D) 100 $\mu$m/(A) 100 $\mu$m/adhesive layer (D) 100 $\mu$m/(B) 500 $\mu$m/outer layer (C) 200 $\mu$m (the EVOH layer (A) was located in the position between about 31% and 38% of the full thickness in the direction of the inside toward the outside), and in Examples 33 and 34 the outer and inner polyolefin layers (C) were omitted to a laminate having a structure of inner EVOH layer (A) 100 $\mu$m/adhesive layer (D) 100 $\mu$m/outer layer (B) 500 $\mu$m.

The results are shown in Table 7 together with the results of Examples 1 and 26.

TABLE 6

| | Resins used in respective layers | | | | Apparent melt viscosity ratio in layer B |
|---|---|---|---|---|---|
| | Layer A | Layer B* | Layer C | Layer D | |
| Ex.26 | Comp.I | B1-1/B2-1 (100/15) | B1-1 | D-1 | 2.5 |
| Ex.27 | Comp.II | B1-1/B2-2 (100/20) | B1-1 | D-1 | 2.7 |
| Ex.28 | Comp.III | B1-1/B2-3 (100/15) | B1-2 | D-1 | 4.3 |
| Ex.29 | Comp.I | B1-1/B2-1 (100/15) | B1-1 | D-1 | 2.5 |
| Ex.30 | Comp.I | B1-1/B2-3 (100/10) | B1-1 | D-1 | 4.3 |
| Ex.31 | Comp.I | B1-2/B2-2 (100/25) | B1-2 | D-1 | 2.7 |
| Ex.32 | Comp.II | B1-2/B2-1 (100/5) | B1-1 | D-1 | 2.5 |
| Ex.33 | Comp.I | B1-1/B2-1 (100/15) | — | D-1 | 2.5 |
| Ex.34 | Comp.I | B1-1/B2-1 (100/10) | — | D-1 | 2.5 |
| Ex.35 | Comp.IV | B1-1/B2-1 (100/15) | B1-1 | D-1 | 2.5 |
| Ex.36 | Comp.V | B1-1/B2-1 (100/15) | B1-1 | D-1 | 2.5 |

Note
*The ratio in the parentheses denotes the weight ratio of polyolefin B1/EVOH B2.

COMPARATIVE EXAMPLE 8

The procedure of Example 26 was repeated except that the layer (A) and the adhesive layers (C) were omitted to give a multi-layer bottle having a structure of inner layer (C) 600 μm/(B) 350 μm/outer layer (C) 150 μm.

The results are shown in Table 7.

COMPARATIVE EXAMPLE 9

The procedure of Example 26 was repeated except that the layer (B) was omitted to give a multi-layer bottle having a structure of inner layer (C) 300 μm /adhesive layer (D) 100 μm /(A) 100 μ/adhesive layer (D) 100 μm /outer layer (C) 500 μm, wherein the EVOH layer (A) was located at the position between about 36% and about 45% of the full thickness in the direction of the inside toward the outside.

The results are shown in Table 7.

EXAMPLE 37

The procedure of Example 26 was repeated except that the polyolefin resin (A3) and the carboxylic acid-modified polyolefin (A5) in the layer (A) were used in amounts of 0.375 part and 0.125 part, respectively.

The results are shown in Table 7.

COMPARATIVE EXAMPLE 10

The procedure of Example 26 was repeated except that the polyolefin resin (A3) and the carboxylic acid-modified polyolefin (A5) in the layer (A) were used in amounts of 150 parts and 50 parts, respectively.

The results are shown in Table 7.

COMPARATIVE EXAMPLE 11

The procedure of Example 26 was repeated except that the EVOH (B2-1) in the layer (B) was used in an amount of 0.1 part.

The results are shown in Table 7.

COMPARATIVE EXAMPLE 12

The procedure of Example 26 was repeated except that the EVOH (B2-1) in the layer (B) was used in an amount of 50 parts.

The results are shown in Table 7.

TABLE 7

| | Amount of permeation of toluene (g/day) | | | Low |
|---|---|---|---|---|
| | After allowing to stand for 7 days | After allowing to stand for 8 weeks | Generation of stress cracks | temperature impact resistance |
| Ex.26 | 0.007 | 0.007 | none | good |
| Ex.27 | 0.007 | 0.007 | none | good |
| Ex.28 | 0.007 | 0.007 | none | good |
| Ex.29 | 0.007 | 0.007 | none | good |
| Ex.30 | 0.009 | 0.009 | none | good |
| Ex.31 | 0.005 | 0.005 | none | good |
| Ex.32 | 0.010 | 0.011 | none | good |
| Ex.33 | 0.010 | 0.015 | none | good |
| Ex.34 | 0.013 | 0.019 | none | good |
| Ex.35 | 0.006 | 0.006 | none | good |
| Ex.36 | 0.012 | 0.015 | none | good |
| Ex.1 | 0.004 | 0.004 | none | generation of cracks |
| Ex.37 | 0.004 | 0.004 | none | generation of cracks |
| Com. Ex.8 | 0.25 | 0.30 | none | good |
| Com. Ex.9 | 0.25 | 0.30 | generation | generation of cracks |
| Com. Ex.10 | 0.18 | 0.22 | none | good |
| Com. Ex.11 | 0.018 | 0.20 | generation | generation of cracks |
| Com. Ex.12 | 0.003 | 0.003 | none | breakage of bottle |

EXAMPLE 38

A multi-layer bottle (volume: about 500 ml) having a structure of inner layer (C) 300 μm/adhesive layer (D) 100 μm/(A) 100 μm/adhesive layer (D) 100 μm/(B) 350 μm/outer layer (C) 150 μm was prepared by an coextrusion multi-layer direct blow molding machine using the following resins in the respective layers.

Layer (A): EVOH A1-1
Layer (B): Resin composition comprising 100 parts of polyolefin resin B1-1, 15 parts of EVOH B2-1 and 10 parts of graft copolymer B3-1 (the ratio of B1-1/B2-1 in apparent melt viscosity measured at 230° C. at a rate of shear of 100 cm$^{-1}$: 2.5)
Inner and outer layers (C): Polyolefin resin B1-1
Adhesive layers (D): Adhesive resin D-1

The EVOH layer (A) was located at the position between about 36% and about 45% of the full thickness in the direction of the inside toward the outside.

The bottle was filled with toluene, sealed and allowed to stand for 7 days. The amount of permeation of toluene at 40°±2° C. determined by measuring the change in weight of the bottle was 0.004 g/day.

The bottle filled with toluene was allowed to stand at 40°±2° C. for 8 weeks, and the amount of permeation of toluene after the storage was measured again. The amount of permeation was 0.004 g/day.

The cross section of this bottle allowed to stand for 8 weeks was observed by an optical microscope. No generation of stress crack owing to the solvent was observed.

The bottle allowed to stand for 8 weeks which was filled with toluene was caused to fall down from the height of 5 m onto a concrete surface at −40° C. in order to estimate the low temperature impact resistance. Then, the amount of permeation of toluene was measured in the same manner as above. The amount of permeation was 0.004 g/day, so there was no change. Thus, it was confirmed that the bottle had a good low temperature impact resistance.

EXAMPLES 39 to 43

Bottles were prepared using the resins shown in Table 8 and estimated in the same manner as in Example 38, provided that in Examples 40 and 41 the thicknesses of the layers were inner layer (C) 300 μm /adhesive layer (D) 100 μm/(A) 100 μm/adhesive layer (D) 100 μm /(B) 500 μm /outer layer (C) 200 μm (the EVOH layer (A) was located in the position between about 31% and about 38% of the full thickness in the direction of the inside toward the outside).

The results are shown in Table 9 together with the results of Example 38.

TABLE 8

|  | Layer A | Layer B* | Layer C | Layer D | Apparent melt viscosity ratio in layer (B) |
|---|---|---|---|---|---|
| Ex. 38 | A2-1 | B2-1/B1-1/B3-1 (15/100/10) | B1-1 | D-1 | 2.5 |
| Ex. 39 | A2-2 | B2-2/B1-1/B3-2 (20/100/10) | B1-1 | D-1 | 2.7 |
| Ex. 40 | A2-3 | B2-3/B1-2/B3-1 (15/100/5) | B1-2 | D-1 | 4.3 |
| Ex. 41 | A2-1 | B2-1/B1-1/B3-3 (15/100/10) | B1-1 | D-1 | 2.5 |
| Ex. 42 | A2-1 | B2-2/B1-1/B3-1 (10/100/5) | B1-1 | D-1 | 2.5 |
| Ex. 43 | A2-1 | B2-2/B1-1/B3-2 (20/100/15) | B1-2 | D-1 | 2.7 |

Note * The ratio in the parentheses denotes the weight ratio of EVOH B2/polyolefin B1/graft copolymer B3.

COMPARATIVE EXAMPLE 13

The procedure of Example 38 was repeated except that the layer (B) and the adhesive layers (C) were omitted to give a multi-layer bottle having a structure of inner layer (C) 150 μm/(A) 350 μm/outer layer (C) 600 μm.

The results are shown in Table 9.

COMPARATIVE EXAMPLE 14

The procedure of Example 38 was repeated except that the layer (B) was omitted to give a multi-layer bottle having a structure of inner layer (C) 300 μm /adhesive layer (D) 100 μm/(A) 100 μm/adhesive layer (D) 100 μm/outer layer (C) 500 μm, wherein the EVOH layer (A) was located at the position between about 36% and about 45% of the full thickness in the direction of the inside toward the outside.

The results are shown in Table 9.

COMPARATIVE EXAMPLE 15

The procedure of Example 38 was repeated except that the use of EVOH (B2-1) in the layer (B) was omitted.

The results are shown in Table 9.

COMPARATIVE EXAMPLE 16

The procedure of Example 38 was repeated except that the use of polyolefin resin (B1-1) in the layer (B) was omitted.

The results are shown in Table 9.

TABLE 9

|  | Amount of permeation of toluene (g/day) | | After impact resistance test | Generation of stress cracks |
|---|---|---|---|---|
|  | After allowing to stand for 7 days | After allowing to stand for 8 weeks | | |
| Ex.38 | 0.004 | 0.004 | 0.004 | none |
| Ex.39 | 0.005 | 0.005 | 0.006 | none |
| Ex.40 | 0.004 | 0.004 | 0.006 | none |
| Ex.41 | 0.004 | 0.004 | 0.004 | none |
| Ex.42 | 0.006 | 0.006 | 0.007 | none |
| Ex.43 | 0.006 | 0.006 | 0.008 | none |

TABLE 9-continued

|  | Amount of permeation of toluene (g/day) | | After impact resistance test | Generation of stress cracks |
|---|---|---|---|---|
|  | After allowing to stand for 7 days | After allowing to stand for 8 weeks | | |
| Com. Ex.13 | 0.25 | 0.30 | 0.30 | none |
| Com. Ex.14 | 0.02 | 0.20 | 0.20 | cracking |
| Com. Ex.15 | 0.02 | 0.20 | 0.20 | cracking |
| Com. Ex.16 | 0.001 | 0.001 | breakage of bottle | none |

In addition to the ingredients used in the Examples, other ingredients can be used in the Examples as set forth in the specification to obtain substantially the same results.

What we claim is:

1. A laminate comprising:
   (A) a layer comprising (A1) a hydrolyzed ethylene-vinyl acetate copolymer having an ethylene content of 10 to 70% by mole and a degree of hydrolysis of at least 85% by mole,
   (B) a layer disposed on one side of layer (A) and of a resin composition comprising (B1) a polyolefin resin and (B2) 0.5 to 40 parts by weight, per 100 parts by weight of said polyolefin resin (B1), of a hydrolyzed ethylene-vinyl acetate copolymer having an ethylene content of 10 to 70% by mole and a degree of hydrolysis of at least 85% by mole, and
   (C) a layer of a polyolefin resin disposed on another side of said layer (A),
   wherein the ratio of the apparent melt viscosity of said polyolefin resin (B1) to that of said hydrolyzed copolymer (B2) at a rate of shear of 100 $cm^{-1}$ and at 230° C. is from 0.1 to 50.

2. The laminate of claim 1, wherein said polyolefin layer (C) is also disposed on the outer side of said resin composition layer (B).

3. The laminate of claim 1, wherein said layer (A) contains (A2) a boron compound.

4. The laminate of claim 3, wherein said boron compound (A2) is contained in said layer (A) in an amount of 0.001 to 0.5% by weight in terms of boron based on said hydrolyzed ethylene-vinyl acetate copolymer (A1).

5. The laminate of claim 1, wherein said layer (B) contains (B3) a graft copolymer of a polyolefin resin and an ethylenically unsaturated carboxylic acid or its derivative which is further reacted with a polyamide subsequently to the graft polymerization of said ethylenically unsaturated carboxylic acid or its derivative.

6. The laminate of claim 5, wherein said polyolefin (B1), said hydrolyzed ethylene-vinyl acetate copolymer (B2) and said graft copolymer (B3) are present in said layer (B) in a (B1):(B2):(B3) ratio of 2 to 200:1:0.01 to 100 by weight.

7. The laminate of claim 1, wherein said layer (A) contains (A3) 5 to 100 parts by weight of a polyolefin per 100 parts by weight of said hydrolyzed ethylene-vinyl acetate copolymer (A1).

8. The laminate of claim 7, wherein said layer (A) further contains (A5) a carboxylic acid-modified polyolefin and (A6) at least one compound selected from the group consisting of a salt, an oxide and a hydroxide of an alkali metal, and a salt, an oxide and a hydroxide of an alkaline earth metal.

9. The laminate of claim 1, wherein said layer (A) contains (A4) a terminal-controlled polyamide resin in which the number of terminal COOH groups (x) and the number of terminal CONRR' groups (y) in which R is a hydrocarbon group having 1 to 22 carbon atoms and R' is a hydrogen atom or a hydrocarbon group having 1 to 22 carbon atoms, are controlled by a terminal controlling agent so as to satisfy the equation: $(100 \times y)/(x+y) \geq 5$.

10. The laminate of claim 9, wherein said hydrolyzed ethylene-vinyl acetate copolymer (A1) and said terminal-controlled polyamide resin (A4) are present in said layer (A) in an (A1):(A4) ratio of 70:30 to 96:4 by weight.

11. The laminate of claim 9, wherein said layer (A) further contains at least one member selected from the group consisting of (A7) a hindered phenol compound, (A8) an alkaline earth metal salt of an aliphatic carboxylic acid, and (A9) at least one compound selected from the group consisting of an ethylenebis(fatty acid amide), a fatty acid metal salt, an ester, a fatty acid ester and a hydrocarbon compound.

12. The laminate of claim 11, wherein the amounts of said components (A7), (A8) and (A9) are 0.01 to 1% by weight, 0.5 to 15 $\mu$mole/g in terms of the alkaline earth metal, and 0.01 to 1% by weight, respectively, based on the sum of the components (A1) and (A4).

13. The laminate of claim 11, wherein said hindered phenol compound (A7) is at least one member selected from the group consisting of N,N'-hexamethylene-bis(3,5-di-t-butyl-4-hydrocinnamamide), 1,3,5-trimethyl-2,4,6-tris(3,5-di-t-butyl-4-hydroxybenzyl)benzene, and pentaerythrityl-tetrakis[3-(3,5-di-t-butyl-4-hydroxy-phenyl) propionate].

14. The laminate of claim 1, wherein said layer (A) is located at the position between 20 to 60% of the full thickness of said laminate in the direction of the inside toward the outside.

15. A container made of a laminate of claim 1.

16. A container made of a laminate of claim 1, which contains volatile compounds composed mainly of hydrocarbons.

* * * * *

UNITED STATES PATENT AND TRADEMARK OFFICE
CERTIFICATE OF CORRECTION

PATENT NO.:    5,849,376
DATED     :    December 15, 1998
INVENTOR(S):   Tsukasa OISHI et al.

It is certified that error appears in the above-identified patent and that said Letters Patent is hereby corrected as shown below:

In Column 2,    line 35, change "$cm^{-1}$" to --$sec^{-1}$--.

In Column 10,   line 48, change "$cm^{-1}$" to --$sec^{-1}$--.

In Column 13,   line 63, change "$cm^{-1}$" to --$sec^{-1}$--.

In Column 16,   lines 5, 16 and 54, change "$cm^{-1}$" to --$sec^{-1}$--.

In Column 23,   line 38, change "$cm^{-1}$" to --$sec^{-1}$--.

In Column 26,   line 33, change "$cm^{-1}$" to --$sec^{-1}$--.

In Column 28,   line 60, change "$cm^{-1}$" to --$sec^{-1}$--.

Signed and Sealed this

Fourteenth Day of March, 2000

Attest:

Q. TODD DICKINSON

Attesting Officer          Commissioner of Patents and Trademarks